United States Patent [19]
Bubar, Sr.

[11] Patent Number: 6,071,589
[45] Date of Patent: *Jun. 6, 2000

[54] METHOD AND ATTACHING JOINDER MEANS TO A SHEET-LIKE MEMBER

[75] Inventor: Darryl J. Bubar, Sr., Boerne, Tex.

[73] Assignee: San Antonio Shoe, Inc., San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/764,851

[22] Filed: Dec. 13, 1996

[51] Int. Cl.[7] ............................................. B32B 7/08
[52] U.S. Cl. ........................ 428/100; 428/99; 428/102; 24/442
[58] Field of Search .................... 428/99, 100, 102; 36/50.1; 24/442

[56] References Cited

U.S. PATENT DOCUMENTS

| | | | |
|---|---|---|---|
| 2,037,970 | 4/1936 | Everston | 36/19 |
| 2,126,601 | 8/1938 | Bain | 12/142 |
| 3,626,610 | 12/1971 | Dassler | 36/11.5 |
| 4,144,297 | 9/1978 | Famolare, Jr. | 36/11.5 |
| 4,216,257 | 8/1980 | Schams et al. | 428/100 |
| 4,571,854 | 2/1986 | Edens | 36/50 |
| 4,770,917 | 9/1988 | Tochacek et al. | 428/100 |
| 4,793,075 | 12/1988 | Thatcher | 36/50 |
| 5,228,216 | 7/1993 | Sargeant | 36/50 |
| 5,438,767 | 8/1995 | Stein | 36/50 |
| 5,634,245 | 6/1997 | Rouser et al. | 24/442 |

*Primary Examiner*—Alexander Thomas
*Attorney, Agent, or Firm*—Miller Sisson Chapman & Nash, P.C.

[57] ABSTRACT

A strap for use on footwear. The strap is comprised of a sheet-like member partially split into two thinner sections. Typically, to the bottom surface of the lower section a VELCRO® pad is secured by stitching. The two sections are then rejoined permanently, as by gluing and/or stitching. The result is a strap which has a joinder or fastening means on the underside thereof which is permanently attached to the strap, but whose top surface (the top surface of the first section) is more aesthetically pleasing.

7 Claims, 1 Drawing Sheet

6,071,589

METHOD AND ATTACHING JOINDER MEANS TO A SHEET-LIKE MEMBER

FIELD OF THE INVENTION

Footwear, more specifically footwear having a first sheet-like member split horizontally with joinder means attached to one of the split sections thereof after which the sections are rejoined, the joinder means for joinder of the first sheet-like member to a second member of the footwear, the two joined members for helping secure the footwear to the wearer.

BACKGROUND OF THE INVENTION

Footwear, such as shoes, sneakers, sandals or the like, typically is comprised of a sole and an upper, the upper for covering some or part of the foot of the wearer. The upper, especially in sandals or the like, typically has straps for overlapping the foot of the wearer and attaching one to the other for securing the footwear to the foot of the wearer. The straps are typically connected by a variety of means such as eyelets and lacing, snaps or Velcro® fasteners. Typically, some means for joining one strap to the other are provided, which straps must be functionally efficient and aesthetically pleasing.

Heretofore, prior art has illustrated straps being typically of sheet-like members, tabular and, typically, having a longitudinal axis with the thickness of the strap being only a small fraction of the length and width dimensions. Prior art joinder means have been provided for connecting the first strap to a second strap, typically by overlapping; the overlapped straps joined one to the other through the use of a Velcro® fastener. The Velcro® fastener is comprised of a pile section which releasably attaches to a loop section in a manner well known in the art. On the footwear securement straps, which typically overlap, the upper strap would carry one of the Velcro® mating surfaces on the underside thereof and the second strap, the lower strap, would carry the second Velcro® mating surface on the upper surface thereof. The straps overlap and the Velcro®, pressed together, provides a releasable attachment for the straps, which in turn hold the footwear to the foot of the wearer.

Such a Velcro®-type footwear securement means is well known in the art. Further, overlapping straps are also utilized with male/female snap members to snap the straps one to the other to secure the footwear to the foot of the wearer. Straps utilized in helping secure footwear to the foot of the wearer are illustrated in the following U.S. Patents:

U.S. Pat. No. 4,114,297, for CINCHING CLOSURE, issued to Famolare, Jr. on Sep. 19, 1978.

U.S. Pat. No. 4,793,075, for SPORT SANDAL FOR ACTIVE WEAR, issued to Thatcher on Dec. 27, 1988.

U.S. Pat. No. 5,228,216, for SINGLE POINT TRIANGULAR ADJUSTMENT SYSTEM FOR SANDALS, issued to Sargeant on Jul. 20, 1993.

U.S. Pat. No. 5,438,767, for SANDAL HAVING ADJUSTABLE STRAPS, issued to Stein on Aug. 8, 1995.

U.S. Pat. No. 3,626,610 (Dassler 1971) illustrates an athletic shoe having at least one strap extending across the division on its upper, the strap having a first Velcro® mating surface on the underside thereof for attachment to a sheet-like member having a second Velcro® mating surface on the upper surface thereof. The athletic shoe disclosed can be, then, secured to the foot of the athlete without using the typical laces and eyelet system.

No particular means are illustrated in the '610 patent for attaching the Velcro® tape to the underside of the straps. The Velcro® is described in the '610 Patent as a self-adhering fastener consisting of a tape having a warped thread fastener of multifilar synthetics and a tape with a multitude of small barbs of monofilar warped threads. The Velcro® fastener is self-adhering—meaning, when pressed together, it removably fastens one Velcro® tape (multifilar) to a second (monofilar barbs).

U.S. Pat. No. 4,114,297 discloses a cinch-type closure on athletic footwear consisting of a strap having a Velcro® sheet attached to the underside thereof for securing, over top of a typical eyelet and lace closure system, to a sheet-like member with Velcro® tape on the upper side thereof. Thus, the strap is overlapped and the cooperative cinching elements are used to snugly secure the footwear to the foot of the user. The '297 Patent illustrates no particular means for attaching the Velcro® pads to the strap.

U.S. Pat. No. 4,793,075 illustrates a novel sandal having a number of retention straps which are joined by self-adhesive type Velcro® pads. The '075 Patent teaches sewing the hook pad to the distal end of a strap and sewing the loop pad to a central portion of the same strap for removably fastening the two portions of the strap one to another.

U.S. Pat. No. 5,228,216 (Sargeant 1993) discloses a novel sports sandal having a number of Velcro® connected straps. The Velcro®-bearing straps are adjustable to the foot of the wearer for securement, one to the other in a manner well known in the trade. However, no particular means are illustrated in the '216 Patent for attaching the Velcro® pads to the strap itself.

U.S. Pat. No. 5, 438,767 (Stein 1995) illustrates a sandal having a number of straps, the straps having Velcro® mating surfaces stitched to one side thereof. The '767 Patent appears to show stitching (see FIG. 2) through the strap and into the Velcro® mating surface for holding the Velcro® pads.

SUMMARY OF THE INVENTION

As can be seen from the foregoing, stitching the Velcro® pads to straps, by stitching completely through the strap and through the Velcro® pad, is known in the art. Further, it is known that Velcro® pads come with self-adhesive backing. While these attachment means for securing the Velcro® or other fastener means to footwear securing straps may be effective, there is a need for securing Velcro® or other fastener means to a strap in such a manner that no stitching or other appearance altering effects destroy the smooth look of the upper side of the strap. That is, for aesthetic and other reasons, there is desired a strap having, on the surface opposite the stitched on fastener means (typically the top surface of the strap), an unmarred appearance. Applicant seeks to provide means, typically a strap, for helping secure footwear to the wearer, the strap having fastener means for fastening to an adjacent strap or portion of the shoe wherein the means for securing the fastener means to the strap does not mar the surface of the strap.

This and other purposes and objects are provided for in applicant's novel strap, the strap comprised of a sheet-like member split into an upper section and a lower section, with one of the upper sections or lower sections (typically the lower section) having fastener means, such as Velcro®, snaps, or the like attached thereto. Readhering the upper section to the lower section after attachment of the fastener means covers up stitching or other means of securing the fastener means to the strap and leaves an aesthetically pleasing strap having an unmarred surface (the upper, for example) and a lower surface with a fastener means (such as Velcro®) which is securely attached (such as by stitching) thereto.

Applicant also provides a novel method for attaching the fastener means, such as Velcro® or the like, to a strap, the strap for helping secure footwear to the foot of the wearer. The method provides for first splitting the strap, typically of leather, sheet-like into an upper and lower section and next attaching, to one of the two sections, a fastener means, such as a Velcro® pad, by some means, such as stitching the pad to the section. Last, the two sections are reattached, as by utilizing an appropriate adhesive such as glue, one to the other—the result being a smooth unmarred surface to one side of the strap with the fastener means attached to the other. An optional addition step is provided in that, after such reattachment of the two sections and the pad, stitching may be provided through the two sections, thus providing an additional means of securing the sections and pad together as a unit. Moreover, when such final stitching is provided (through the two sections and the Velcro® pad) there is less need for the necessity of maintaining sufficient margin between the stitching and the edge of the strap, as would be required if no splitting had occurred. That is, when stitching alone is used on unsplit straps, a sufficient margin (typically 1/16" to 3/32") must be maintained or the Velcro® pad will pull apart at the edges after continued use.

DETAILED DESCRIPTION OF THE PREFERRED EMBODIMENT

Figure 1:
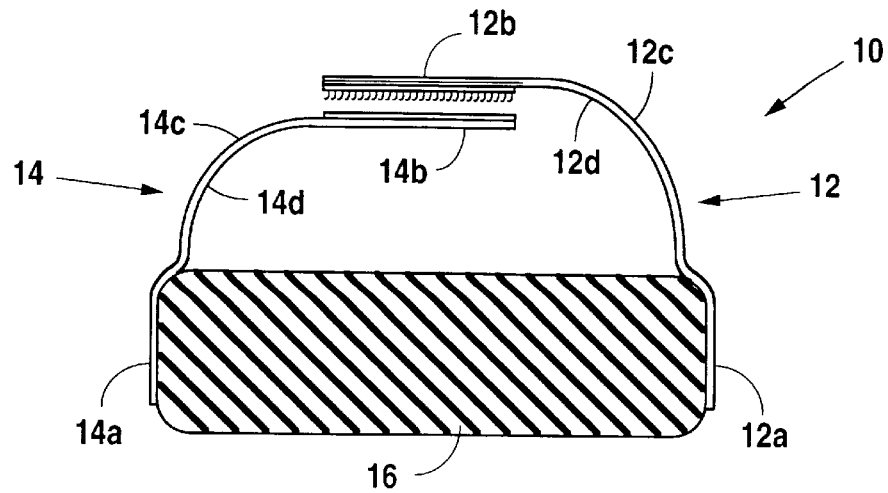
FIG. 1 is an elevational view of a cross-section of applicant's invention showing two overlapping shoe securement straps with opposed Velcro® pads.
Figure 2:
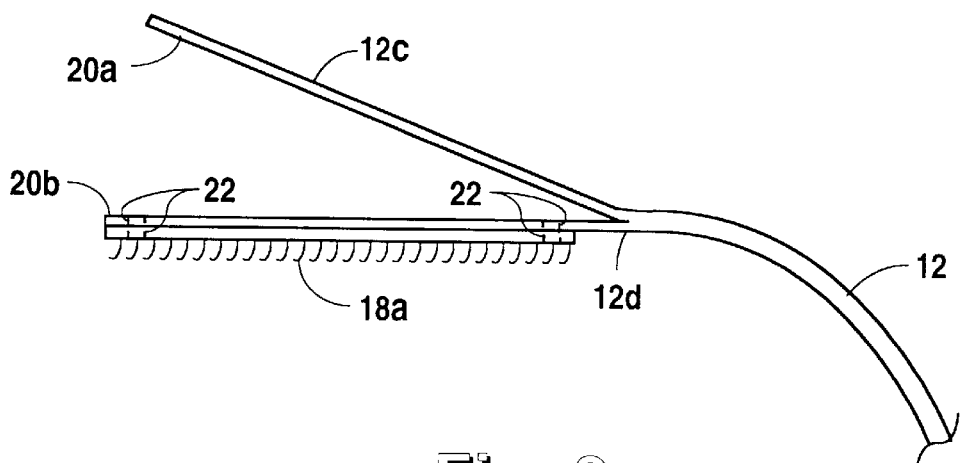
FIG. 2 is an elevational cross-section of one strap of applicant's present invention showing the strap split into an upper section and a lower section with a fastener means (here, a Velcro® pad) attached to the bottom surface of the lower section by stitching.
Figure 3:
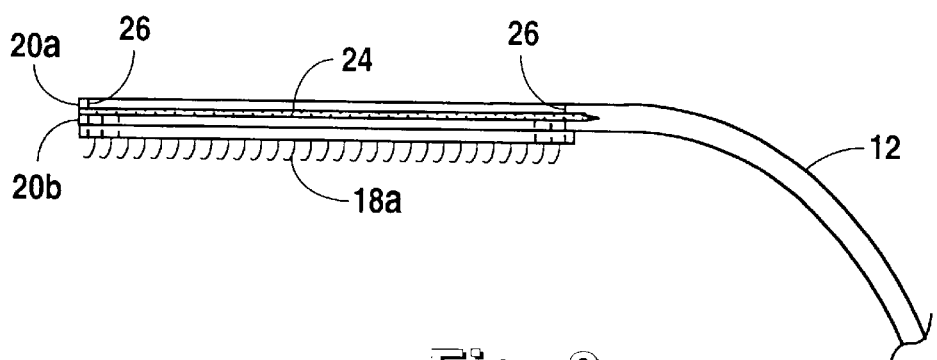
FIG. 3 illustrates an elevational view of applicant's present invention with the upper section and lower section illustrated in FIG. 2 reattached by gluing with final stitching joining the upper, lower and Velcro® pad sections.

FIGS. 1–3 all illustrate views of applicant's present invention. Applicant's present invention provides, in footwear (10) typically, a shoe, sneaker, sandal, or the like, a first strap (12), and a second strap (14), the straps attached either directly or indirectly to a sole (16) of the footwear. The straps are designed to help secure the footwear to the foot of the wearer.

First strap (12) is attached at a near end (12b) to the sole, either directly or indirectly, indirectly by means of attachment as by attachment to an upper. At removed end (12b) of the strap is found a first Velcro® pad (18a), (for example, having a barbed section,) for engagement with a second Velcro® pad (18b) (for example, having a loop section) located on removed end (14b) of second strap (14) such that the two straps may be releasably and overlappingly secured, one to the other by means of the Velcro® securement pads (18a and 18b.)

Turning now to the details of applicant's invention, it is seen that first strap (12) has a bottom surface (12d) and a top surface (12c). Typically, these straps are made of leather, approximately 0.060 to 0.075 inches thick. At the removed end of the first strap, the leather or other suitable material is carefully split into an upper sheet, or section 20a, and a lower sheet, or section 20b. This splitting is done in the manner set forth in U.S. patent application Ser. No. 08/518,040, now abandoned the specification and drawings of which are incorporated herein by reference. The longitudinal extent of the split is dictated by the size of the Velcro® pad intended to be located on the strap.

As is seen in the adjoining figures, the pad (18a) is stitched typically by double stitching (22) to lower section (20b) such that pad (18a) is on bottom surface (12d) near or at removed end (12b) of the first strap (12). Stitching (22) may be single or double and in any particular pattern. Moreover, pad (12a) may also have a self-adhesive on the backing thereof to attach directly to bottom surface (12d) or may also be glued thereto.

Following splitting of the removed end and securing the Velcro® pad, the two sections are rejoined, by using a suitable cement or glue and pressing the upper section (20a) to lower section (20b) and allowing the glue to dry.

The result of this procedure is an aesthetically pleasing strap wherein the top surface of the removed end of the strap is unmarred by stitching yet the Velcro® pad or the like is securely held to the strap by stitching. Additionally, a second stitching here illustrated by single stitching (26) in FIG. 3 may be utilized in which the two sections (upper and lower) are stitched together along with the pad. Further, because the pad is already firmly adhered, as by stitching or the like, to the strap, a final single stitching (26) may be provided with narrower margins (A) than has heretofore been possible. That is, without these splitting and securing steps, if single stitching (26) is utilized to secure the pad to the strap (rather than splitting, stitching and gluing), a sufficiently wide margin at (A), typically at least 1/8 inches, is required to prevent the pad from pulling loose, after repeated use, from the underside of the strap. The same procedure is typically utilized at removed end (14b) of second strap (14).

Intended within the disclosure and claims of the invention herein described is the utilization of the splitting process with any sheet-like material designed to assist in securing footwear to the foot of the wearer. For example, sheet-splitting with attachment to one section thereof may be utilized with materials shaped other than straps, as for example, overlapping panels serving as closure means for securing footwear to the wearer's foot. Moreover, while the illustrations feature the use of hook and loop fastener pads of the Velcro® type for locking cooperative engagement, one to the other, snaps may also be utilized with the split/reglue method of applicant's present invention.

Terms such as "left," "right," "up," "down," "bottom," "top," "front," "back," "in," "out," and the like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A strap for use on footwear the strap comprising:
   a sheet-like member comprised of leather having a first thickness, the sheet-like member having an upper section with a second thickness and a lower section with a third thickness, the sum of second and third thicknesses about equal to the first thickness;
   joinder means attached to the bottom surface of the lower section of said sheet-like member, said joinder means capable of joining said sheet-like member to another part of the footwear;
   means for permanently securing substantially all of the upper section of said sheet-like member to the lower section thereof.

2. The strap as set forth in claim 1 wherein said joinder means is a Velcro® pad.

3. The device as set forth in claim 1 wherein said means for securing is glue.

4. The device as set forth in claim 1 wherein said means for securing is thread stitching.

5. The device as set forth in claim 1 further including thread stitching for attaching joinder means to one of the sections.

6. The device as set forth in claim 5, wherein said joinder means is a Velcro® pad.

7. The device as set forth in claim 1 wherein said means for securing is glue and further comprising means for securing the upper section to the lower section, said securing means comprised of thread stitching.

* * * * *